United States Patent [19]

Sakai et al.

[11] Patent Number: 4,709,792

[45] Date of Patent: Dec. 1, 1987

[54] METHOD OF CONTROLLING CREEP PREVENTING DEVICE FOR VEHICLE EQUIPMENT WITH AUTOMATIC TRANSMISSION

[75] Inventors: Shino Sakai, Saitama; Masao Nishikawa, Tokyo, both of Japan

[73] Assignee: Honda Giken Kogyo Kabushiki Kaisha, Tokyo, Japan

[21] Appl. No.: 924,177

[22] Filed: Oct. 27, 1986

Related U.S. Application Data

[63] Continuation of Ser. No. 512,892, Jul. 11, 1983.

[30] Foreign Application Priority Data

Jul. 12, 1982 [JP] Japan .............................. 57-121055
Aug. 20, 1982 [JP] Japan .............................. 57-144142

[51] Int. Cl.⁴ ...................... B60K 41/28; F16D 43/28
[52] U.S. Cl. ............................. 192/0.044; 192/0.055; 192/0.09; 192/0.094; 192/109 F
[58] Field of Search ............... 192/0.044, 0.052, 0.055, 192/0.082, 0.09, 0.094, 3.56, 109 F

[56] References Cited

U.S. PATENT DOCUMENTS

| | | | |
|---|---|---|---|
| 4,105,101 | 8/1978 | Förster et al. | 192/0.055 X |
| 4,116,321 | 9/1978 | Miller | 192/109 F X |
| 4,194,608 | 3/1980 | Usui et al. | 192/0.052 X |
| 4,298,109 | 11/1981 | Dörpmund et al. | 192/0.044 |
| 4,363,389 | 12/1982 | Zaunberger et al. | 192/0.055 X |
| 4,373,619 | 2/1983 | Schritt et al. | 192/0.052 X |
| 4,444,297 | 4/1984 | Parsons | 192/109 F X |
| 4,465,168 | 8/1984 | Sato | 192/109 F X |
| 4,487,303 | 12/1984 | Boueri et al. | 192/0.052 |
| 4,513,638 | 4/1985 | Nishikawa et al. | 192/0.052 X |

FOREIGN PATENT DOCUMENTS 2101256  1/1983  United Kingdom ............ 192/109 F

Primary Examiner—Rodney H. Bonck
Assistant Examiner—Richard M. Lorence
Attorney, Agent, or Firm—Armstrong, Nikaido, Marmelstein & Kubovcik

[57] ABSTRACT

In a creep preventing device of the type in which an oil discharge passage communicating with an oil tank is branched from an oil feed passage for supplying an operating oil pressure to a starting clutch or other starting elements of an automatic transmission of a vehicle and an electromagnetic valve capable of closing the oil discharge passage under the demagnetized state and opening it under the excited state is disposed in the oil discharge passage, a method of controlling the creep preventing device is characterized in that when the electromagnetic valve is returned from the excited state to the demagnetized state, the electromagnetic valve is chopped a predetermined number of times. This method can re-connect the starting elements smoothly without incurring any shock.

5 Claims, 7 Drawing Figures

METHOD OF CONTROLLING CREEP PREVENTING DEVICE FOR VEHICLE EQUIPMENT WITH AUTOMATIC TRANSMISSION

This application is a continuation of application Ser. No. 512,892 filed 7/11/83.

BACKGROUND OF THE INVENTION

1. Field of the Invention

This invention relates to a method of controlling a creep preventing device for a vehicle equipped with an automatic transmission. More particularly, the present invention relates to a method of controlling a creep preventing device which method can release the device from the operating state without any shock.

2. Description of the Prior Art

When a gear shift lever is kept set to a driving position (advancing position) during stoppage of a vehicle equipped with an automatic transmission, so-called "creep", in which the vehicle moves forward against the will of a driver, occurs due to the dragging torque of a torque convertor. To cope with this creep, the driver must keep pressing a brake pedal considerably strongly. This phenomenon is not advantageous for an engine, either, because idle opening of a throttle valve must be expanded excessively so as to offset this dragging torque and hence, the fuel consumption increases as much.

As one of the devices for preventing the creep, a device has been known in the past in which an oil discharge passage communicating with an oil tank is branched from an oil passage which supplies an operating oil pressure to a starting clutch of the automatic transmission, and an electromagnetic valve which closes the oil discharge passage under the demagnetized state and opens it under the excited state is disposed in the discharge oil passage. This device excites and opens the electromagnetic valve only during stoppage of the vehicle so as to escape the oil pressure supplied to the starting clutch to the discharge oil passage and to cut off the starting clutch and thus to prevent the creep of the vehicle. However, the following problems must be solved when putting this device into practical application.

To start the vehicle, the creep preventing device must be made to be inoperative and the starting clutch must be again connected. In this case, a certain kind of shock is likely to develop inevitably. A valve for progressively increasing a pressure or an accumulator may be employed, in principle, in order to establish re-connection of the starting clutch, but the use of such a valve or accumulator will result in the increase of size and complication of construction. Moreover, the oil passages will become more complicated in construction, and the increase in cost of production is unavoidable.

SUMMARY OF THE INVENTION

In order to eliminate the problems described above, the present invention is directed to provide a method of controlling a creep preventing device which method can smoothly reconnect a starting clutch in the same way as when a valve for progressively increasing a pressure or the like is used, by an extremely simple operation of merely chopping a power feed circuit of an electromagnetic valve of the creep preventing device.

In order to accomplish the object described above, in a creep preventing device of the type in which an oil discharge passage communicating with an oil tank is branched from an oil feed passage for supplying an operating oil pressure to a starting clutch or other starting means of an automatic transmission and an electromagnetic valve which can close the oil discharge passage under the demagnetized state and can open it under the excited state is disposed in the oil discharge passage, a method of controlling the creep preventing device for a vehicle equipped with the automatic transmission in accordance with the present invention is characterized in that a power feed circuit for the electromagnetic valve is chopped a predetermined number of times when the valve is returned from the excited state to the demagnetized state.

In accordance with the control method of the present invention, the power feed circuit of the electromagnetic valve is chopped a predetermined number of times when the electromagnetic valve of the creep preventing device is returned from the excited state to the demagnetized state, as described above. Because the oil discharge passage is gradually closed by this arrangement, the operating oil pressure for the starting clutch increases gradually and progressively, so that the clutch can be re-connected smoothly without incurring any shock. Moreover, chopping described above can be effected by applying a simple modification to the conventional electric circuit of the electromagnetic valve without increasing the size and making the construction more complicated. Accordingly, the oil passages do not become further complicated and hence, the present invention is extremely advantageous from the aspect of the cost of production.

In the control method of the present invention described above, if the electromagnetic valve is demagnetized in advance for a predetermined period of time so as to bring the starting means into a predetermined semi-operative state, the starting means can shift from the semi-operative state to the full operative state within a relatively short period of time by the subsequent chopping operation of the electromagnetic valve, thereby improving the riding comfort and preventing unnecessary blow-up of the engine.

These and other objects, features and advantages of the present invention will become more apparent from the following description when taken in conjunction with the accompanying drawings.

DESCRIPTION OF THE PREFERRED EMBODIMENTS

Figure 1:
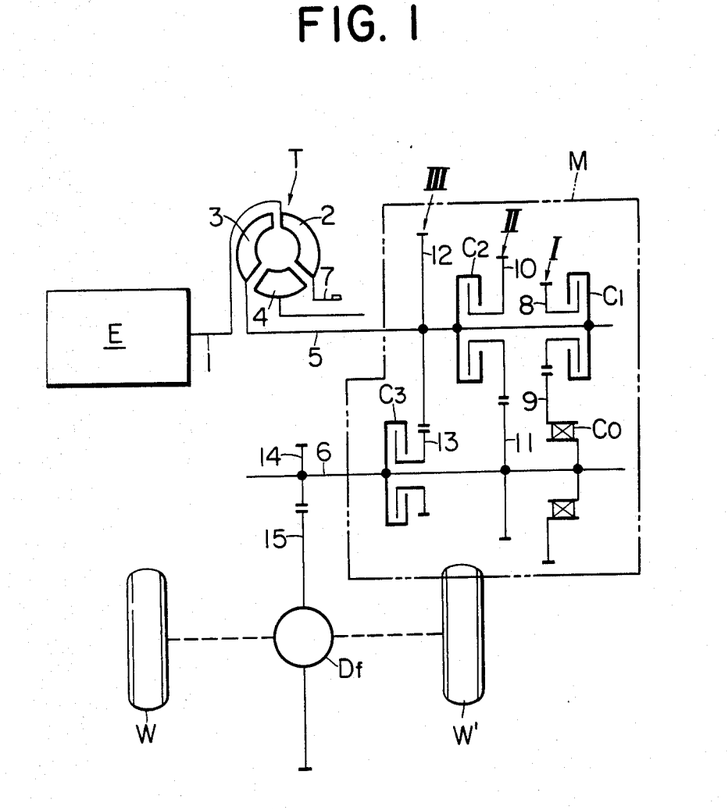
FIG. 1 is a diagram showing the power system of a vehicle equipped with an automatic transmission to which the method of the present invention is applied.

Hereinafter, one preferred embodiment of the present invention will be described with reference to the accompanying drawings. Referring initially to FIG. 1, the output of an engine E is transmitted to driving wheels W, W' from a crank shaft 1 sequentially through a torque convertor T, an auxiliary transmission M and a differential gear Df, and drives the wheels W, W'.

Figure 2:
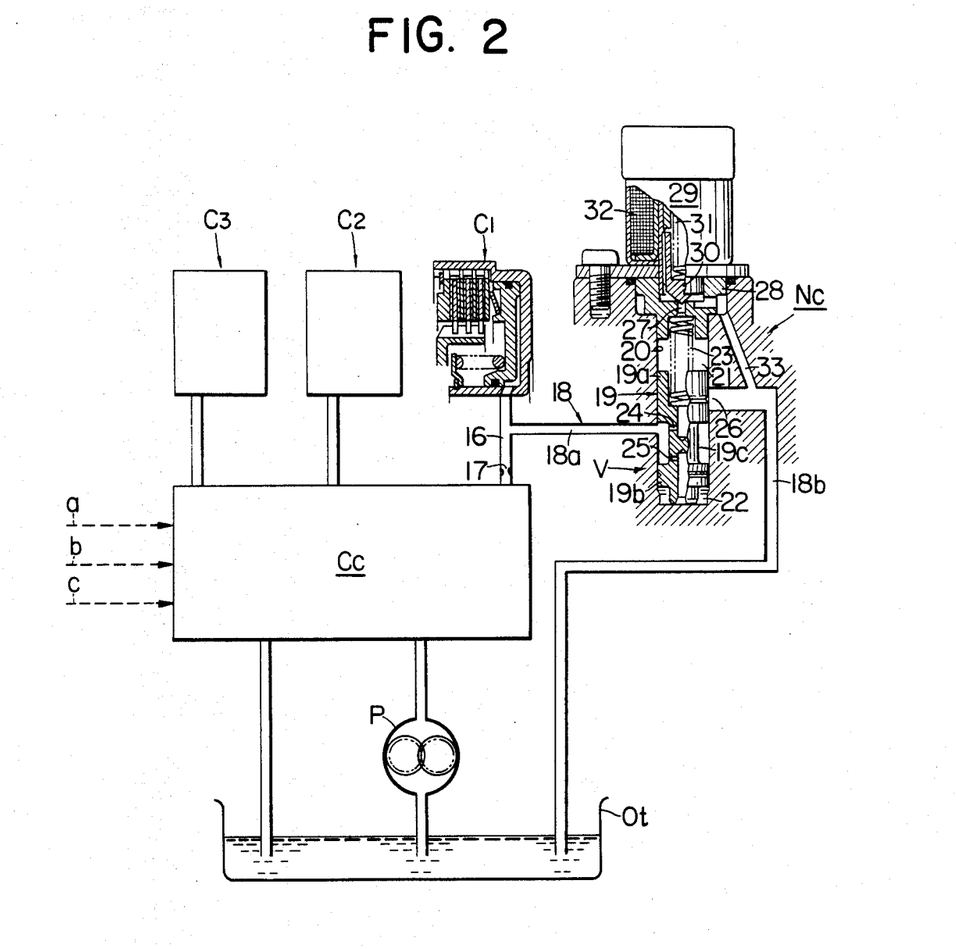
FIG. 2 is an oil pressure circuit diagram including a creep preventing device for the automatic transmission.

The torque convertor T consists of a pump vane wheel 2 connected to the crank shaft 1, a turbine vane wheel 3 connected to an input shaft 5 of the auxiliary transmission M and a stator 4 interposed between both vane wheels 2 and 3. The torque transmitted from the crank shaft 1 to the pump vane wheel 2 is from thence transmitted fluid-dynamically to the turbine vane wheel 3. When torque amplification is effected between them, the stator 4 bears the reaction force, as is well known in the art. A pump driving shaft 7 for driving an oil pressure pump P, shown in FIG. 2, is disposed on the right of the pump vane wheel 2.

First-, second- and third-speed stage gear trains I, II and III are juxtaposed with one another between the input and output shafts 5 and 6 of the auxiliary transmission that are parallel to each other. The first-speed stage gear train I consists of a driving gear 8 which is connected to the input shaft 5 via a first-speed stage clutch, that is, a starting clutch $C_1$, and a driven gear 9 which is interconnected to the output shaft 6 via a one-way clutch $C_o$ and engaged with the driving gear 8. The second-speed stage gear train II consists of a driving gear 10 which is interconnected to the input shaft 5 via a second-speed stage clutch $C_2$, and a driven gear 11 which is interconnected to the output shaft 6 and engages with the driving gear 10. The third-speed stage gear train III consists of a driving gear 12 which is interconnected to the input shaft 5, and a driven gear 13 which is interconnected to the output shaft 6 via a third-speed stage clutch $C_3$ and engages with the driving gear 12.

When only the first-speed stage clutch $C_1$ is connected, the driving gear 8 is interconnected to the input shaft 5, thereby establishing the first-speed stage gear train I. The torque is transmitted from the input shaft 5 to the output shaft 6 via this gear train I. Next, when the second-speed stage clutch $C_2$ is connected while the first-speed stage clutch $C_1$ is kept connected, the driving gear 10 is interconnected to the input shaft 5, thereby establishing the second-speed stage gear train II. The torque is transmitted from the input shaft 5 to the output shaft 6 via this gear train II. In the interim, the output shaft 6 rotates at a greater speed than the driven gear 9 of the first-speed stage gear train I due to the difference of the transmission ratios of the first- and second-speed stage gear trains I and II, so that the one-way clutch $C_o$ rotates idly and virtually stops the first-speed stage gear train I.

When the second-speed stage clutch $C_2$ is cut off and the third-speed stage clutch $C_3$ is connected while the first-speed stage clutch $C_1$ is kept connected, the driven gear 13 is interconnected to the output shaft 6, thereby establishing the third-speed stage gear train III. The torque is transmitted from the input shaft 5 to the output shaft 6 through this gear train III. In this case, too, the one-way clutch $C_o$ rotates idly and stops the first-speed stage gear train I in the same manner as in the case of establishment of the second-speed stage gear train II.

The torque transmitted to the output shaft 6 is then transmitted from the output gear 14, which is disposed at an end portion of the output shaft 6, to a large diameter gear 15 of the differential gear Df. Incidentally, a backward gear train and parking means are omitted for simplifying the description.

In FIG. 2, when driven by the pump driving shaft 7, the oil pressure pump P pressure-feeds the oil inside the oil tank Ot to a transmission control device Cc. The transmission control device Cc receives a vehicle speed signal a and a throttle valve opening signal b representing the magnitude of the output of the engine E, and selectively feeds the oil pressure of the oil pressure pump P to the first-, second- and third-speed stage clutches $C_1$, $C_2$ and $C_3$ whenever the values of these signals exceed predetermined reference values. Upon receiving the oil pressure, each clutch is connected and establishes the corresponding gear train, as described above. The transmission control device Cc may be of a full oil pressure type, an electro-hydraulic type using electromagnetic valves, and so forth. The discharge pressure of the oil pressure pump P itself may be variable upon receiving the torque conversion ratio signal c of the torque convertor T.

A creep preventing device Nc is disposed between the first-speed stage clutch, or the starting clutch $C_1$, and the transmission control device Cc. This device Nc is constituted by disposing an orifice 17 in an oil feed passage 16 connecting the transmission control device Cc to the oil pressure chamber of the starting clutch $C_1$, and interposing a control valve V of a pilot type in an oil discharge passage 18 branching from the oil feed passage 16 downstream of the orifice 17 and extending to the oil tank Ot.

The control valve V includes a spool valve 19, which is stored in a cylindrical valve chamber 20 formed at an intermediate part of the oil discharge passage 18 in such a manner as to divide the oil discharge passage 18 into an upstream portion 18a communicating with the oil feed passage 16 and a downstream portion 18b communicating with the oil tank Ot. Oil chambers 21 and 22 are defined above and below the valve 19, respectively. A return spring 23 is mounted in the upper oil chamber 21 so as to bias downward the spool valve 19. This spool valve 19 includes a pair of upper and lower lands 19a, 19b, an annular groove 19c interposed between these lands, and orifices 24, 25 communicating this groove 19c with the upper and lower oil chambers 21, 22, respectively. The annular groove 19c constantly communicates with the upstream portion 18a, and when the upper land 19a moves up and down, a port 26 to the valve chamber 20 of the downstream portion 18b is opened and closed. Preferably, the port 26 has a round cross-section, for example, so that the effective open area of the port increases progressively in accordance with the upward movement of the upper land 19a. An end wall member 28 having an orifice 27 is disposed at the upper end of the valve chamber 20, and an electromagnetic valve 29 having a pilot needle valve 30 for opening and closing this orifice 27 is disposed further on the end wall member 28. The needle valve 30 closes the orifice 27 by the force of a spring 31 and opens the orifice when a solenoid 32 is excited. When opened, the orifice 27 is communicated with a bypass oil passage 33 branching from the downstream portion 18b of the oil discharge passage 18.

When the electromagnetic valve 29 is excited to open the orifice 27 while the transmission control device Cc is supplying the oil pressure to the oil feed passage 16 so as to connect the starting clutch $C_1$, the operating oil passing through the orifice 17 of the oil feed passage 16 is discharged to the oil tank Ot sequentially through the upstream portion 18a of the oil discharge passage 18, the annular groove 19c, the orifice 24, the upper oil chamber 21, the orifice 27, the bypass oil passage 33 and the downstream portion 18b. The oil flow generated at this time inside the valve chamber 20 moves up the spool valve 19 against the force of the return spring 23, so that the upper land 19a opens the port 26. In consequence, the oil discharge passage 18 becomes fully conductive and the pressure oil passing through the orifice 17 is discharged to the oil discharge passage 18 with hardly any resistance. Thus, the starting clutch $C_1$ is cut off, preventing the creep of the vehicle. In the interim, the flow rate of the pressure oil from the transmission control device Cc to the oil feed passage 16 is limited to a predetermined rate by the orifice 17.

When the orifice 27 is closed after the electromagnetic valve 29 is demagnetized, the oil flow from the annular groove 19c to the upper oil chamber 21 is stopped so that the spool valve 19 moves down against the force of the return spring 23, the port 26 is closed by the upper land 19a and the oil discharge passage 18 is cut off. Accordingly, the oil pressure supplied by the transmission control device Cc to the oil feed passage 16 is completely introduced into the oil pressure chamber of the starting clutch $C_1$ and brings it into a connected state. Hence, the vehicle can advance.

In this case, if the oil discharge passage 18 is rapidly cut off, the oil pressure inside the oil pressure chamber of the starting clutch $C_1$ rapidly increases, thereby abruptly causing a creep and hence, shock, of the vehicle, as described previously. In order to mitigate this shock, the present invention chops the power feed circuit of the electromagnetic valve 29 a predetermined number of times within a predetermined period of time, and at the same time, increases the length of the non-feed time during chopping with the passage of time. According to this arrangement, the pilot needle valve 30 repeats opening and closing a number of times corresponding to the number of times of chopping and the closing time length becomes longer with the passage of time. For this reason, the oil flow rate passing through the orifice 27 progressively decreases and the downward movement of the spool valve 19 occurs gently, thus cutting off gradually the oil discharge passage 18. Since the pressure of the oil pressure chamber of the starting clutch $C_1$ increases progressively, re-connection of the clutch $C_1$ can be effected smoothly without any shock.

Figure 3:
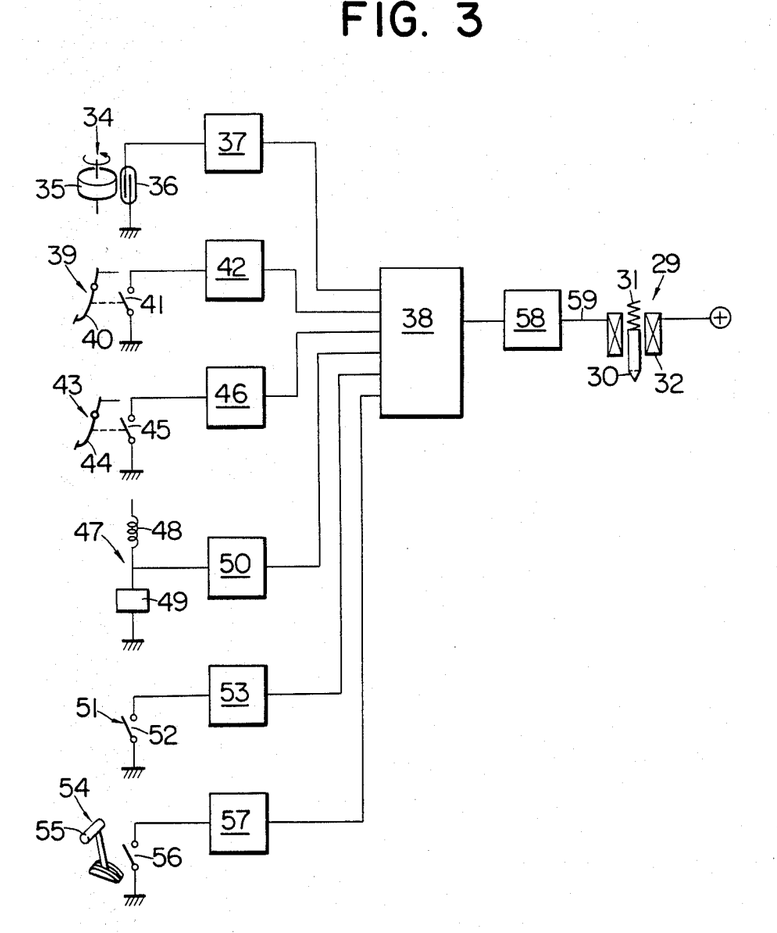
FIG. 3 is an electric control circuit diagram of the creep preventing device.

An example of the electric circuit for controlling the feed of power to the electromagnetic valve 29 is shown in FIG. 3.

In the drawing, a vehicle speed detector 34 rotates a magnet rotor 35 in the interlocking arrangement with the rotation of the wheels and pulse signals are generated by a lead switch 36 which interrupts its contact in accordance with the rotation of the rotor. The pulse signals are applied to a micro-computer 38 through an interface circuit 37, and the vehicle speed is calculated by the micro-computer from the period of the input pulses.

An accelerator pedal operation detector 39 includes a normally-open switch 41 which is closed only when an accelerator pedal 40 is pressed. When this switch 41 is closed, a signal is generated and is applied to the micro-computer 38 through an interface circuit 42.

A brake pedal operation detector 43 includes a normally-open switch 45 which is closed only when a brake pedal 44 is pressed. When this switch 45 is closed, a signal is generated and is applied to the micro-computer through still another interface circuit 46.

A detector 47 for detecting the number of revolution of the engine picks up a spark pulse signal from between a spark coil 48 and igniter 49 of the engine, and this signal is also applied to the micro-computer 38 through an interface circuit 50. The number of revolution of the engine is calculated by the computer from the period of the input pulses.

An engine temperature sensor 51 includes a normally-open switch 52 which is closed only when the temperature of the cooling water of the engine rises above a predetermined level. When this switch 52 is closed, a signal is generated and is applied to the micro-computer 38 through an interface circuit 53.

A driving position detector 54 includes a normally-open switch 56 which is closed only when a gear shift lever 55 is set to the driving position (advancing position). When this switch 56 is closed, a signal is generated and is applied to the micro-computer 38 through an interface circuit 57.

Figure 4:
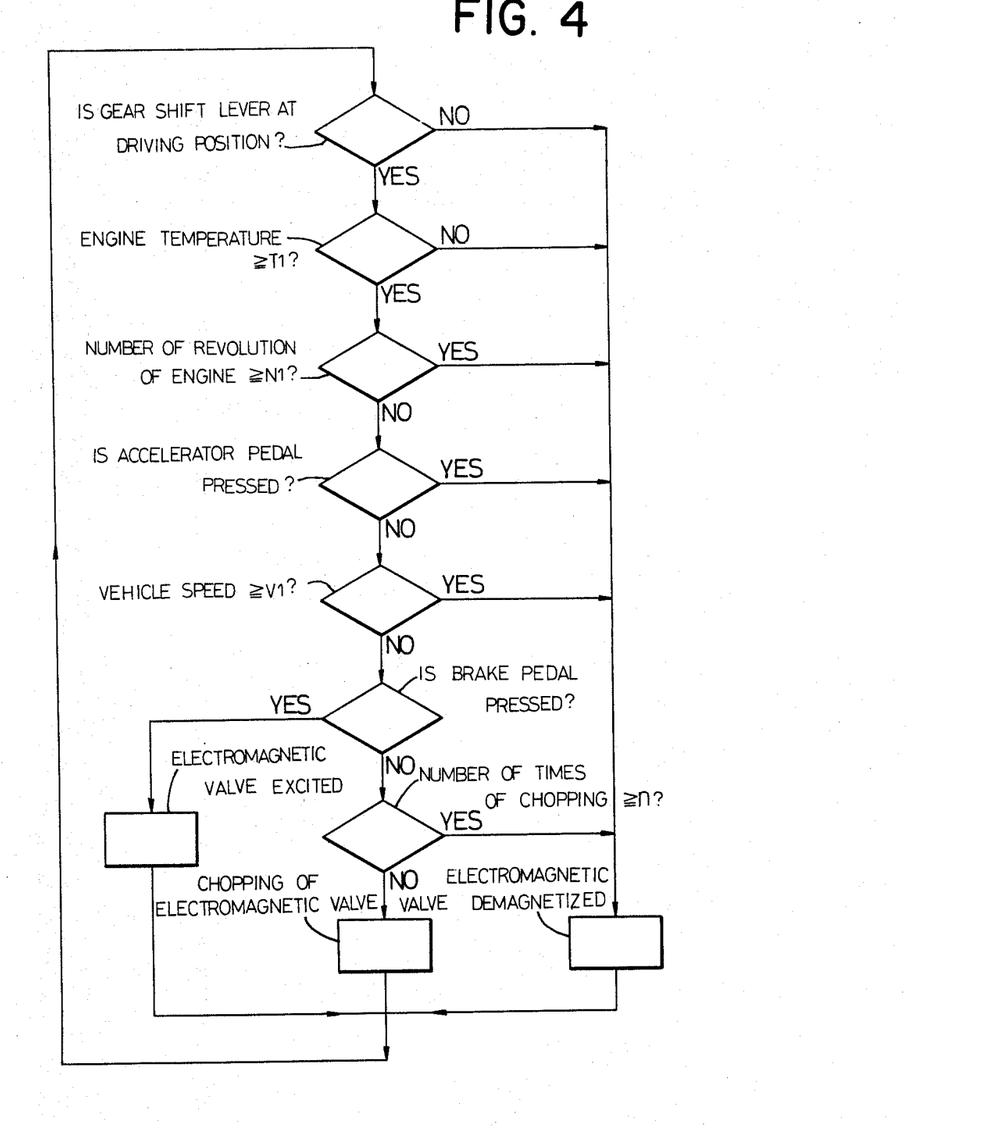
FIG. 4 is a flow chart for controlling an electromagnetic valve of the creep preventing device.

A program is stored in the micro-computer 38 on the basis of the flow chart shown in FIG. 4. The computer processes the input signals from the various detectors and sensor described above and sends a signal to a driving circuit 58 in accordance with the program described above. When the input signal is at a high level, for example, the driving circuit 58 operates and closes the power feed circuit 59 of the electromagnetic valve 29 and opens the circuit when the input signal is at a low level.

As can be seen clearly from the flow chart of FIG. 4, it is when the gear shift lever 55 is set to the driving position, the engine temperature is above a predetermined value $T_1$, the number of revolution of the engine is below a predetermined value $N_1$, the vehicle speed is below a predetermined value $V_1$ and the brake pedal 44 is pressed, that the electromagnetic valve 29 is excited, or the creep preventing device Nc is actuated.

Figure 5:
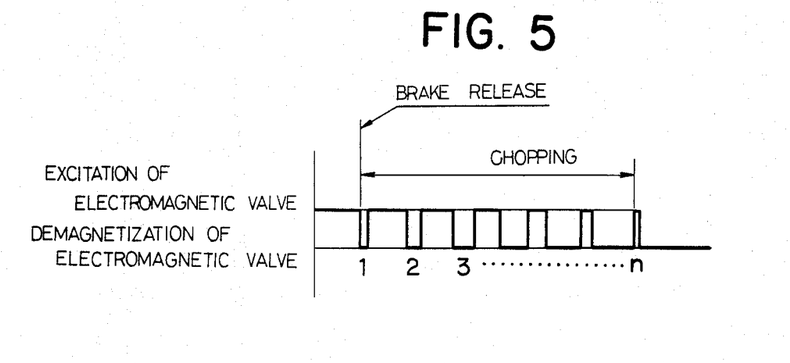
FIG. 5 is a time chart at the time of chopping the electromagnetic valve.

When the brake pedal 44 is released during the operation of the creep preventing device Nc, chopping of the electromagnetic valve 29 is effected a predetermined number of times n within a predetermined period of time, and after chopping is confirmed, the electromagnetic valve 29 is demagnetized and the creep preventing device returns to its inoperative state. FIG. 5 shows the time chart for this chopping.

When the accelerator pedal 40 is pressed along with the release of the brake pedal 44 during chopping of the electromagnetic valve 29, the electromagnetic valve 29 stops chopping and is immediately brought into the demagnetized state. Accordingly, the creep preventing device Nc can return immediately to the inoperative state. This provides the effect that blow-up of the number of revolution of the engine due to connection delay of the starting clutch $C_1$ can be prevented and the vehicle can start smoothly.

Figure 6:
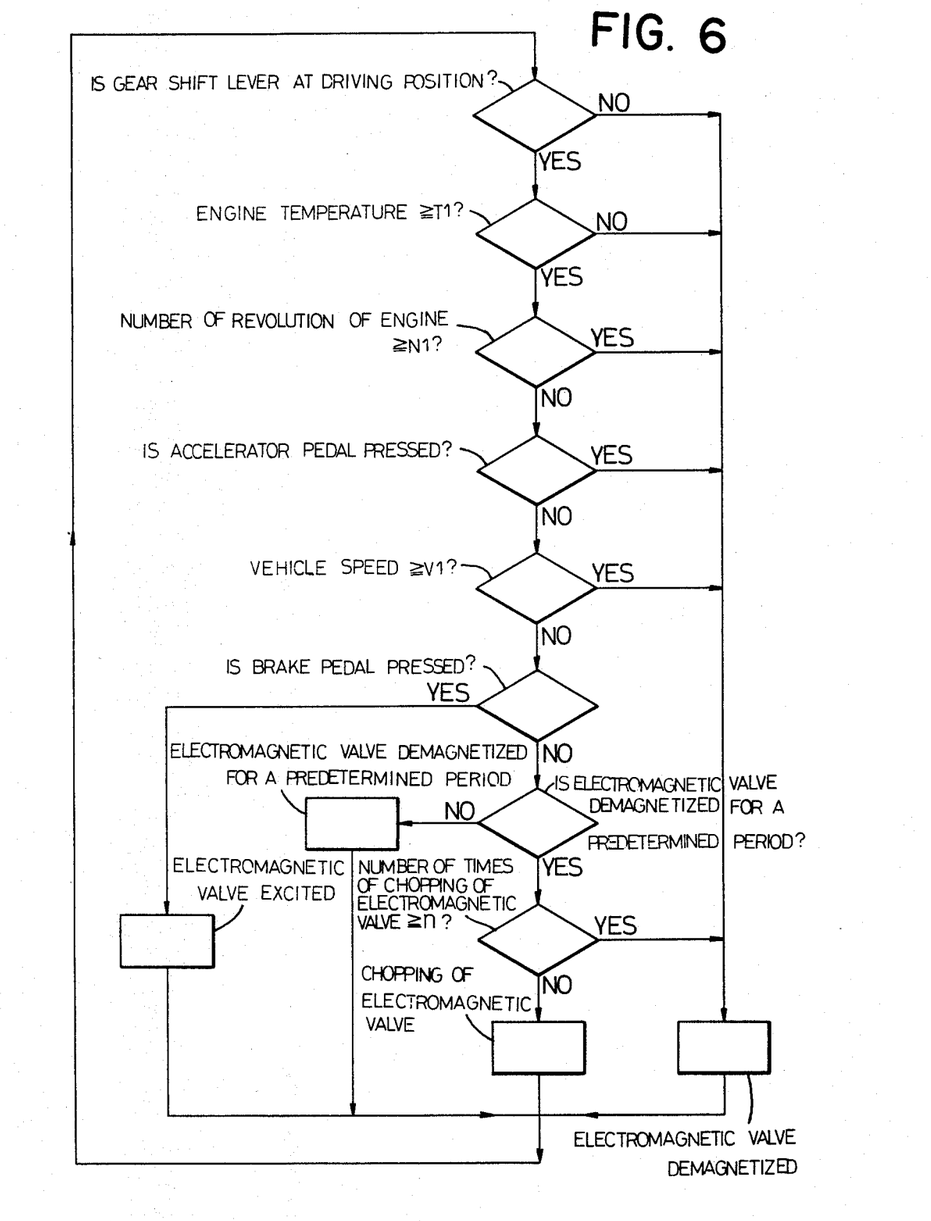
FIG. 6 is a flow chart showing a modified example of the control method shown in FIG. 4.

FIG. 6 shows a modified embodiment of the controlling method of the present invention shown in FIGS. 4 and 5. In this modified embodiment, a step of demagnetizing the electromagnetic valve 29 for a predetermined period of time by the control of the micro-computer 38 is added in order to bring the starting clutch $C_1$ into the desired semi-clutch state before chopping of the electromagnetic valve 29 is effected. In accordance with this modified embodiment, since the electromagnetic valve 29 is first demagnetized for a predetermined period of time, the pilot needle valve 30 closes the orifice 27 so that downward movement of the spool valve 19 takes place immediately, the oil discharge passage 18 is contracted and hence, the pressure of the oil feed passage 16 rapidly increases, thereby establishing the half-clutch state of the starting clutch $C_1$. Next, since chopping of the electromagnetic valve 29 is effected in the same way as in the method described previously, the starting clutch $C_1$ can smoothly shift from the half-clutch state to the full connected state.

Figure 7:
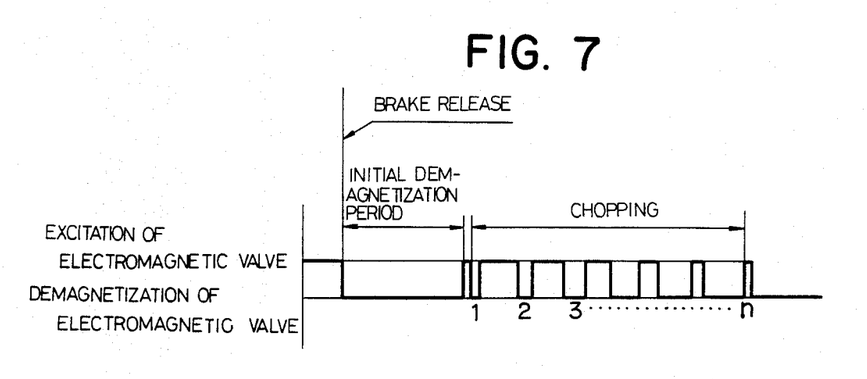
FIG. 7 is a time chart at the time of demagnetizing and thereafter chopping the electromagnetic valve for respective predetermined periods at the initial stage in accordance with the flow chart shown in FIG. 6.

FIG. 7 shows the time chart of demagnetization of the electromagnetic valve 20 for a predetermined period at the initial stage and its chopping.

While the present invention has been particularly shown and described with reference to the preferred embodiments thereof, it will be understood by those skilled in the art that the present invention may be practiced otherwise than as specifically described within the scope of the appended claims.

What is claimed is:

1. In a creep preventing device for a vehicle equipped with an automatic transmission in which an oil discharge passage communicating with an oil tank is branched from an oil feed passage for supplying an operating oil pressure to a starting means of the automatic transmission and an electromagnetic valve capable of closing said oil discharge passage under the demagnetized state and opening the same under the excited state is disposed in said oil discharge passage, a method of controlling the creep preventing device comprising the steps of:

chopping a power feed circuit controlling said electromagnetic valve a predetermined number of times in the course of the creep preventing device coming into an inoperative state in response to the release of an associated brake pedal when said electromagnetic valve is returned from the excited state to the demagnetized state; and stopping the chopping of the power feed circuit to immediately bring the electromagnetic valve into the demagnetized state, when an associated accelerator pedal is pressed during the chopping step of the power feed circuit of the electromagnetic valve thereby rendering the creep preventing device inoperative for swift connection of said starting means.

2. The method of controlling a creep preventing device for a vehicle equipped with an automatic transmission as defined in claim 1, further comprising the step of demagnetizing said electromagnetic valve for a predetermined period of time in order to bring said starting means into a desired semi-operative state before said chopping step.

3. The method of controlling a creep preventing device for a vehicle equipped with an automatic transmission as defined in claim 1 or 2 wherein the length of the power non-feed time during chopping is increased with the passage of time.

4. The method of controlling a creep preventing device for a vehicle equipped with an automatic transmission as defined in claim 1, wherein said starting means is a starting clutch.

5. The method of controlling a creep preventing device for a vehicle equipped with an automatic transmission as defined in claim 1, wherein when said accelerator pedal is pressed prior to the chopping step, said electromagnetic valve is promptly put into the demagnetized state without being subject to the chopping step.

* * * * *